Aug. 30, 1966 U. H. KOCH 3,269,698
VALVE
Filed Sept. 27, 1963 2 Sheets-Sheet 1
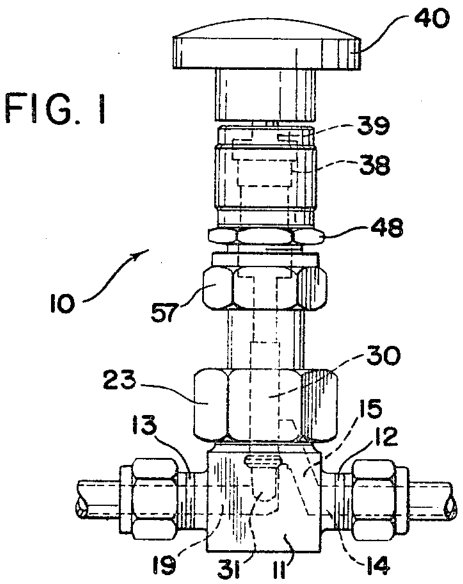
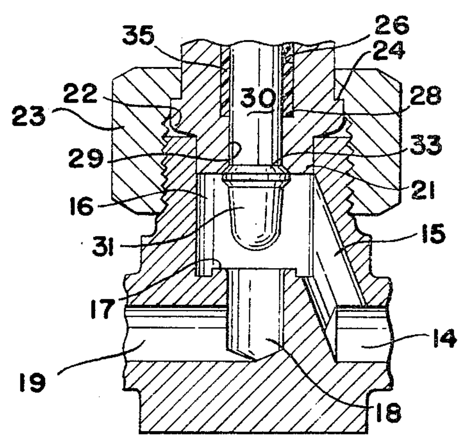
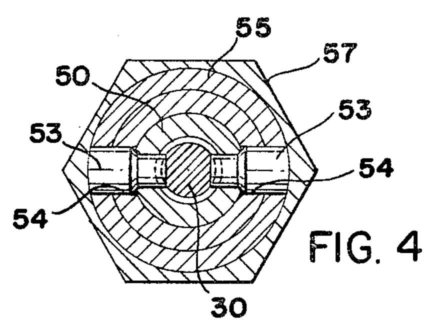
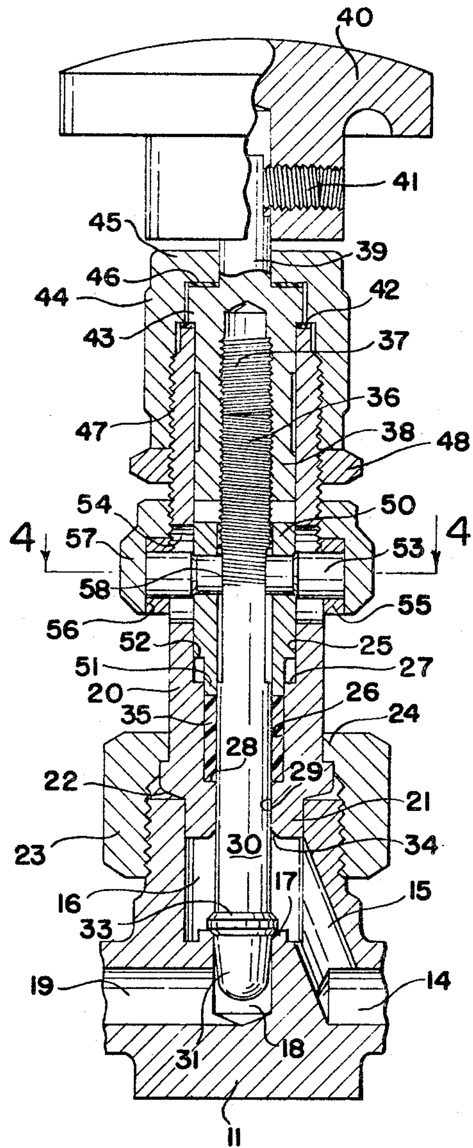
INVENTOR.
ULRICH H. KOCH
BY
*Fay & Fay*
ATTORNEYS Aug. 30, 1966 U. H. KOCH 3,269,698

VALVE

Filed Sept. 27, 1963 2 Sheets-Sheet 2

INVENTOR.
ULRICH H. KOCH

BY

Fay & Fay
ATTORNEYS

United States Patent Office 3,269,698

Patented August 30, 1966

3,269,698

VALVE

Ulrich H. Koch, Pinole, Calif., assignor to Whitey Research Tool Co., Oakland, Calif., a corporation of California Filed Sept. 27, 1963, Ser. No. 312,115
9 Claims. (Cl. 251—214)

This invention relates to valves and more particularly to valves adapted to control the flow of corrosive fluids.

In the handling of corrosive fluids, it is of first importance that the valve be leak tight to prevent escape of the fluid handled to the surrounding environment. Another factor of equal importance, but not as obvious, is the requirement that the valve be able to withstand the corrosive effects of the fluid it carries, so that continued valve operation will be insured despite the characteristics of the particular material being handled.

The valve here disclosed is of the nonrising type in which the operating handle assembly is separate from the valve stem, and fixed against axial movement so that rotation of the handle causes the stem to be independently reciprocated. The means for reciprocating the valve stem invariably includes a threaded connection between the handle and the stem. Accordingly, it is necessary to assure that the threaded connection is isolated from the corrosive fluid to prevent adverse effects on the threads and consequent impairment of valve operation.

It is an object of this invention to provide a valve having improved sealing characteristics.

It is another object of this invention to provide a sealing arrangement for a valve with an improved means for adjusting the compression of the packing.

It is a further object of this invention to provide a nonrising valve wherein the threads on the valve stem are isolated from the fluid by an improved adjustable sealing mechanism.

It is a still further object of this invention to provide, in a nonrising valve, an adjustable packing means which includes a means for preventing rotation of the valve stem.

A further object of the present invention is to provide a packing gland adjustment mechanism whereby the compression on the valve packing may be adjusted externally of the valve body.

A more specific object of the invention is to provide a valve packing mechanism whihc includes a pair of semicircular ring members having pins mounted thereon which project through the valve bonnet and through an adjustable packing gland into a pair of axially disposed grooves on the valve stem, with the pins being movable longitudinally of the valve body by coaction with a packing adjustment nut threadedly secured to the valve body.

A more complete object of the invention is to provide a valve which includes a body portion to which is secured a bonnet with a valve stem disposed longitudinally of the bonnet and interconnected with an operating handle, the upper end of the valve stem being externally threaded for cooperation with an internally threaded rotatable bushing having an end extending externally of the bonnet and connected to the operating handle, the bonnet having a packing ring in a groove surrounding the valve stem at a point below the threaded end thereof, and a pair of semicircular rings disposed exteriorly of the bonnet above the packing with a pair of pins secured to said rings and extending radially inwardly from the rings through slots provided in the bonnet wall and in engagement with a packing gland disposed above the packing, the semicircular rings being received in a circumferential groove provided in a packing adjustment nut which is threadedly connected with the outer surface of the bonnet whereby rotation of the adjusting nut relative to the bonnet causes the pins to move the packing gland downwardly to compress the packing about the valve stem, and the inner ends of the pins being engaged with flats on the valve stem to prevent the latter from rotating during reciprocating movement thereof.

To the accomplishment of the foregoing and related ends, the following description sets forth in detail selected embodiments of the invention. The specific embodiments shown are not intended to be limiting for they constitute but a few of the various ways in which the principles of the invention may be used.

In the drawings wherein like reference numerals indicate like parts in the several views:

FIG. 1 is a side elevation view of the valve embodying the principles of the instant invention.

FIG. 2 is a side elevation view, partly in section, illustrating the operating mechanism for the stem and the packing gland adjustment.

FIG. 3 is a partial side elevation in section showing the valve in open position.

FIG. 4 is a view taken along line 4—4 of FIG. 2 and illustrating the details of the packing gland adjustment.

Figures 5, 6:
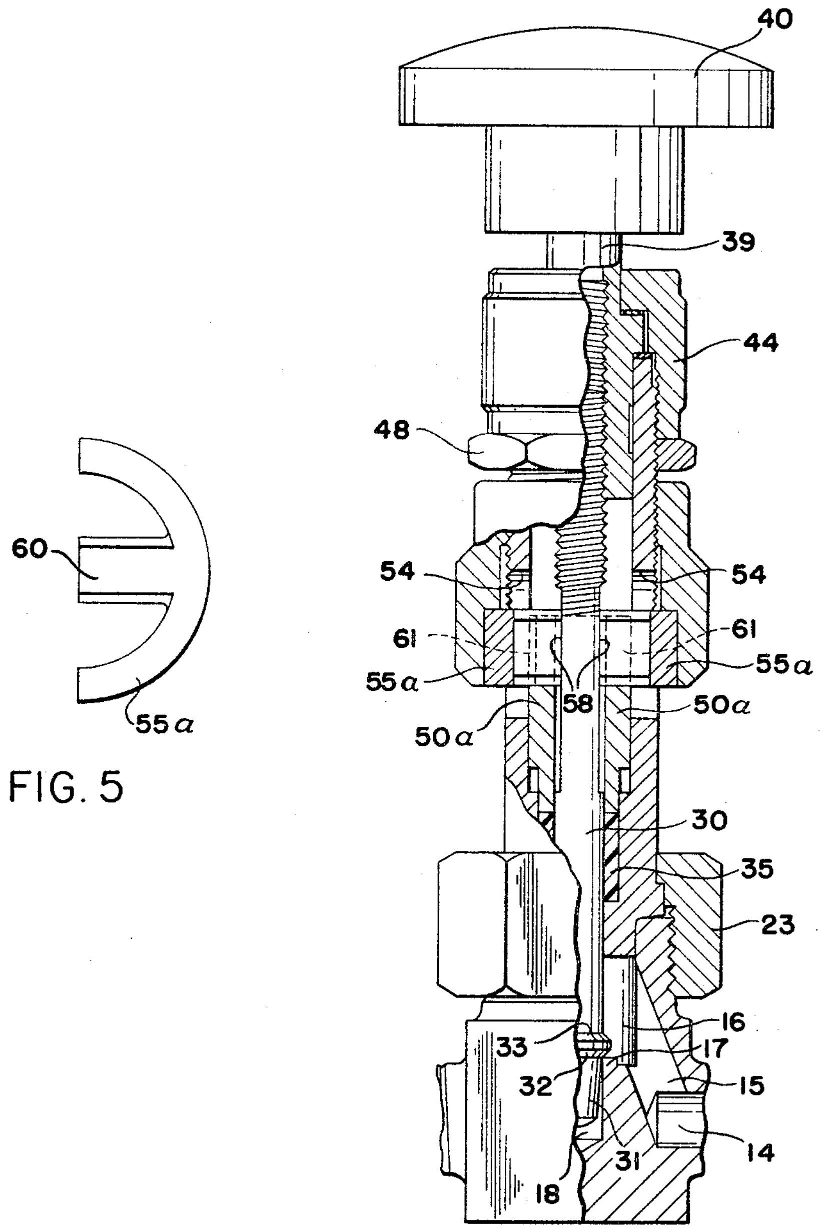
FIG. 5 illustrates an alternative embodiment of the adjusting ring.
FIG. 6 is a side elevation, partly in section, of the valve utilizing the modified adjusting ring of FIG. 5.

Turning to FIG. 1, there is illustrated a valve, indicated generally by the reference numeral 10, which embodies the basic principles of the present invention. The valve is of the so-called straight pattern type, and includes a body 11 having threaded inlet and outlet ports 12 and 13 respectively. Passing through the inlet port 12 into the body 11 is an inlet bore 14 which is connected by passageway 15 to a valve chamber 16 formed centrally of the body 11. The valve chamber 16 opens upwardly of the body 11, and defines, at its inner end, a valve seat 17. A passageway 18 interconnects the valve chamber 16 with an outlet passage 19.

A bonnet 20 is mounted on the valve body 11 with the lower end 21 of the bonnet 20 being received within the valve chamber 16. Adjacent the lower end of the valve bonnet 20 is a tranvserse coniform shoulder 22 which serves to restrain the penetration of the valve bonnet 20 into the valve chamber 16. A union nut 23 is threadedly secured to the upper end of the valve body 11 and is telescopically received over the bonnet 20 with the nut 23 including a radially inwardly directed flange 24 which cooperates with the shoulder 22 thereby to secure the bonnet 20 to the valve body 11, and to urge the coniform shoulder 22 into fluid tight engagement with such body.

The bonnet 20 includes a central bore 25 which extends longitudinally of the bonnet and opens outwardly at the upper end thereof. At the lower end of the bonnet 20, there is provided a bore 26 of a diameter smaller than the bore 25 with a shoulder 27 formed at the juncture of the two bores. The bore 26, in turn, terminates at a shoulder 28 with a bore 29 passing out of the bonnet at the lower end thereof.

Mounted in the bonnet 20 and in guided relationship with the bore 29 is a valve stem 30. The stem includes a valving head 31 at the lower end thereof, which is provided with an annular rib presenting a lower frusto conical wall 33 adapted to abut a complementarily shaped groove 34 formed on the lower end of the bonnet 20 thus to provide a back seating arrangement. This arrangement serves to form a seal for the valve in the full open position, and also prevents the stem from being forcibly ejected from the valve in the event of failure or improper operation.

Encircling the stem 30 and disposed in the bore 26 is packing 35 which may be of Teflon, asbestos or some other appropriate material. The packing 35 extends upward to a point below the shoulder 27 and rests against the shoulder 28 of the bore 26.

The upper end of the valve stem 30 includes threads 36 which are adapted to mate with the interior threads 37 of an operating sleeve 38. The sleeve 38 is telescopically received over the threaded end of the valve stem 30 within the bore 25 of the bonnet 20. The upper end of the operating sleeve 38 includes a stem 39 to which is secured, by set screw 41, an operating handle 40. Thus, upon rotation of handle 40 and operating sleeve 38, the stem 30 will be reciprocated within the valve bonnet due to the interaction of the threads 36, 37 on the stem and the sleeve respectively.

The sleeve 38 is rotatably mounted within the valve bonnet by thrust washers 42 of nylon or the like which are interposed between the end of the valve bonnet 20 and a flange 43 on the sleeve. A bushing nut 44 is telescopically received over the stem 39 and the bonnet 20, with the bushing nut including a radially inwardly directed flange 45 which overlies the flange 43 on the operating sleeve. A thrust washer 46, also of nylon or the like, is interposed between the flanges 45 and 43. The bushing nut 44 is mated with threads 47 on the exterior of the valve bonnet 20, and lock nut 48 is provided to secure the bushing nut in position.

To exert a compressive force on the packing 35 and thereby assure proper sealing characteristics, there is provided internally of the valve bonnet a packing gland 50 which encircles the valve stem 30 and is movable longitudinally in the bore 25 of the bonnet 20. The lower end of the packing gland 50 includes an axially projecting flange 51 which is of a reduced diameter and to be slidably received within the bore 26. The juncture of the flange 51 and the gland 50 includes a radial shoulder 52 which is adapted to engage the shoulder 27 and thereby limit the longitudinal movement of the gland 50.

To accomplish the longitudinal movement of the packing gland 50, there is secured to the gland at diametrically opposed positions thereof a pair of pins 53. The pins 53 project radially outwardly of the valve bonnet through openings 54 in the bonnet wall with the radially outer ends of the pins 53 each secured in separate semicircular rings 55. Each of the rings are identical and, in combination, form a completed circular ring.

The rings 55 and the pins 53 secured thereto are received in a circular groove 56 which is provided in a packing adjustment nut 57. The packing adjustment nut is received over the valve bonnet 20 and is in threaded engagement with the same threads 47 on the exterior of the bonnet 20 as the bushing nut 44. The inner ends of the pins 53 project radially inwardly beyond the packing gland 50 and engage with flats or grooves 58 which are formed longitudinally of the stem 30. Due to the engagement of the pins 53 with the flats on the stem 30, the stem is prevented from rotation during the imparting of reciprocal motion thereto.

Turning to the operation of the valve as disclosed, the operator, to actuate the valve, turns the valve handle 40 to impart rotation to the operating bushing 38. Due to the threaded interconnection of the bushing 38 and the threaded end 36 of the stem 30, the valve stem transverses the bonnet 20 longitudinally and thereby displaces the valving head 32 from the valve seat 17. Due to the friction of the threaded connection between the stem 36 and the threads 37 of the bushing 38, there is a tendency for the rotation of the bushing to be imparted to stem 30. However, engagement of the pins 53 with the bonnet 20 and the flats 58 effectively restrains stem rotation and a pure reciprocal motion is obtained.

To adjust the compressive force on the packing 35, an operator need only rotate the packing adjustment nut 57 which, being threaded on bonnet 20, causes the packing nut to travel longitudinally along its axis. Longitudinal movement is, in turn, imparted to the gland 50 by rings 55 and pins 53. Thus, as the nut travels longitudinally, so also does the ring and in arrangement causing the gland 50 to exert a greater or lesser compression on packing 35. The elongated slots or flats 58 permit the pins 53 to travel lengthwise of the stem 30 without any effect on the relative positions of the stem and without destroying the function of preventing stem rotation.

It is to be noted and emphasized that the pins 53 perform a duality of functions. The first is to provide a means for adjusting the compressive force on the packing through rotation of an external packing nut, and the second is the prevention of rotation of the valve stem 30 during adjustment of the valve. Distinguished from this is the prior art which found it necessary to provide separate mechanisms to accomplish these diverse functions. However, by utilization of the principles of this invention, a great simplification has been accomplished without a sacrifice in operating efficiency.

Turning to FIG. 5, there is illustrated an alternative embodiment of the adjusting ring. In this alternative embodiment, the pin and ring combination have been made integral. Thus, FIG. 5 illustrates one of the semicircular rings **55*a* with a radially inwardly projecting pin 60 formed integral with the ring. It is apparent that the pin 60 functions in a manner similar to that of pins 53, described above. However, a modified packing gland 50*a* may be utilized. Thus, the pins 60 project through the openings 54 and are received in slots 61 formed at the upper edge of the gland 50*a*. The pins 60 project inwardly through the slots 61 into engagement with the grooves or flats 58 on the stem 30** thereby to restrain the stem from rotation in the manner described above.

It is not my intention that the illustrated embodiments nor the terminology employed in describing them be limiting inasmuch as variations of these may be made without departing from the spirit of the invention; but rather, it is desired to be restricted only by the scope of the appended claims.

I claim:

1. In a valve having a body,
a valve stem,
a bonnet secured to said body and supporting said valve stem for longitudinal movement therein,
packing material in said bonnet and surrounding a portion of said stem,
an adjustable packing assembly comprising a gland slidably mounted on said stem and adapted to engage said packing material to exert a compressive force thereagainst,
radially projecting pin means associated with said gland and projecting outwardly through slots in the walls of said bonnet,
an adjustment nut encircling said bonnet and being threadedly secured thereto,
ring means received in a groove in said adjustment nut with the radially outer ends of said pin means being secured to said ring means and the radially inner ends of said pin means extending inwardly of said gland and being received in longitudinal groove means on said stem.

2. The structure of claim 1 wherein said pin means are plural in number,
said ring means comprising a pair of semicircular members, with some of said plural pin means being secured to one of said semicircular members and the other of said plural pin means being secured to the other of said semicircular members.

3. The structure of claim 2 wherein said pin means are formed integral with said ring means at the radially outer ends of said pin means.

4. In a valve having a housing,
a valve stem disposed in said housing for longitudinal movement therein,
packing material in said housing surrounding a portion of said stem,
an adjustable packing assembly comprising a gland slidably mounted on said stem and adapted to engage said packing material to exert a compressive force thereagainst, gland adjustment means movably supported on said housing, means operatively connecting said gland with said adjustment means to move said gland into compressive engagement with said packing material, said means including structure for performing the dual function of transmitting movement to said gland and restraining said valve stem from rotation relative to said housing.

5. In a valve having a body, a valve stem, a bonnet secured to said body and supporting said valve stem for longitudinal movement therein, packing material in said bonnet and surrounding a portion of said stem, an adjustable packing assembly comprising a gland slidably mounted on said stem and adapted to engage said packing material to exert a compressive force thereagainst, a plurality of radially projecting pins associated with said gland and projecting through slots in the walls of said bonnet, an adjustment nut encircling said bonnet and being threadedly secured thereto, said adjustment nut being in engagement with the radially outer ends of said pins whereby movement of said nut causes movement of said pins longitudinally of said stem.

6. In a valve having a body, a valve stem, a bonnet secured to said body and supporting said valve stem for longitudinal movement therein, packing material in said bonnet and surrounding a portion of said stem, an adjustable packing assembly comprising a gland slidably mounted on said stem and adapted to engage said packing material to exert a compressive force thereagainst, a plurality of radially projecting pins secured to said gland and projecting outwardly through slots in the walls of said bonnet, an adjustment nut encircling said bonnet and being threadedly secured thereto, said adjustment nut being operatively associated with the radially outer ends of said pins whereby longitudinal movement of said adjustment nut imparts a corresponding movement to said pins and said gland, the radially inner ends of said pins being received in longitudinal grooves on said stem thereby to prevent rotation of said stem relative to said valve housing.

7. A valve for controlling the flow of fluid in a line comprising, a valve body having a flow passage therethrough, a bonnet secured to said body, a valve stem in said bonnet, said valve stem including a seat adapted to be projected into said passage thereby to prevent the flow of fluid therethrough, the upper end of said valve stem having threads formed thereon, packing material in said bonnet surrounding a portion of said stem below said threads, an operating bushing rotatably mounted on the upper end of said bonnet and projecting into said bonnet, the portion of said bushing projecting into said bonnet including a bore threadedly receiving the upper end of said valve stem, an operating handle secured to said bushing for rotation therewith, a packing gland slidably mounted on said stem in said bonnet and adapted to engage said packing material thereby to exert a compressive force thereagainst, a packing adjustment nut threadedly secured to said valve bonnet, and means interconnecting said adjustment nut with said gland whereby rotation of said nut imparts a longitudinal movement to said gland.

8. The valve of claim 4 wherein, said structure includes a plurality of radially projecting pins secured to said gland with the radially outer ends of said pins projecting through slots in the walls of said housing, said adjustment means including an adjustment nut encircling said housing and being movably secured thereto, ring means received in a groove in said adjustment nut with said radially outer ends of said pins being secured to said ring means.

9. The structure of claim 8 wherein, the radially inner ends of said pins are in engagement with said valve stem.

References Cited by the Examiner

UNITED STATES PATENTS

| | | | |
|---|---|---|---|
| 1,794,442 | 3/1931 | Cannon | 251—267 X |
| 2,109,801 | 3/1938 | Parker | 251—270 |

WILLIAM F. O'DEA, *Primary Examiner.*

ISADOR WEIL, *Examiner.*

D. MATTHEWS, *Assistant Examiner.*